US012697986B2

(12) United States Patent
Han et al.

(10) Patent No.: US 12,697,986 B2
(45) Date of Patent: Aug. 4, 2026

(54) TORQUE MONITORING SYSTEM AND METHOD OF A HYBRID ELECTRIC VEHICLE

(71) Applicants: HYUNDAI MOTOR COMPANY, Seoul (KR); KIA CORPORATION, Seoul (KR)

(72) Inventors: Jung Suk Han, Hwaseong-si (KR); Jae Hyoung Jeong, Seoul (KR); Hyung Min Kim, Ansan-si (KR); Jung Yong Choi, Pohang-si (KR); Sang Won Lee, Hwaseong-si (KR); Yeon Bok Kim, Seongnam-si (KR); Hyeok Jun Kwon, Seoul (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 121 days.

(21) Appl. No.: 18/666,085

(22) Filed: May 16, 2024

(65) Prior Publication Data

US 2025/0222942 A1    Jul. 10, 2025

(30) Foreign Application Priority Data

Jan. 10, 2024    (KR) ........................ 10-2024-0003938

(51) Int. Cl.
B60W 50/038 (2012.01)

(52) U.S. Cl.
CPC ... B60W 50/038 (2013.01); *B60W 2710/0666* (2013.01)

(58) Field of Classification Search
CPC .................. B60W 50/0338; B60W 2710/0666

USPC ......................................................... 701/29.2
See application file for complete search history.

(56) References Cited

U.S. PATENT DOCUMENTS

| | | | | |
|---|---|---|---|---|
| 7,286,915 B2 | 10/2007 | Lee | | |
| 12,122,349 B1 * | 10/2024 | Amstutz | ............... | B60W 10/08 |
| 2007/0102206 A1 | 5/2007 | Lee | | |

(Continued)

FOREIGN PATENT DOCUMENTS

KR        20070050997 A      5/2007

*Primary Examiner* — Erin M Piateski
*Assistant Examiner* — Michael T Dowling
(74) *Attorney, Agent, or Firm* — Lempia Summerfield Katz LLC

(57) ABSTRACT

A torque monitoring system and method of a hybrid electric vehicle is provided that accurately monitors and diagnoses a compensation torque, such as an intervention torque generated from the vehicle's perspective and an engine friction torque, in addition to a driver's request torque. The torque monitoring system includes a control unit configured to: determine final command torques for respective power sources; determine a requested torque for monitoring based on vehicle driving information; determine compensation torques for the respective power sources depending on whether an engine clutch is engaged based on intervention torques for the respective power sources and additional torques for the respective power sources; determine a command torque limit value; and determine whether there is an abnormality in each torque determination process based on the determined command torque limit value and a sum of the determined final command torques for the respective power sources.

21 Claims, 3 Drawing Sheets

(56)         References Cited

U.S. PATENT DOCUMENTS

2015/0151736 A1*   6/2015  Kim ...................... B60W 20/10
                                              180/65.265

* cited by examiner

PRIOR ART

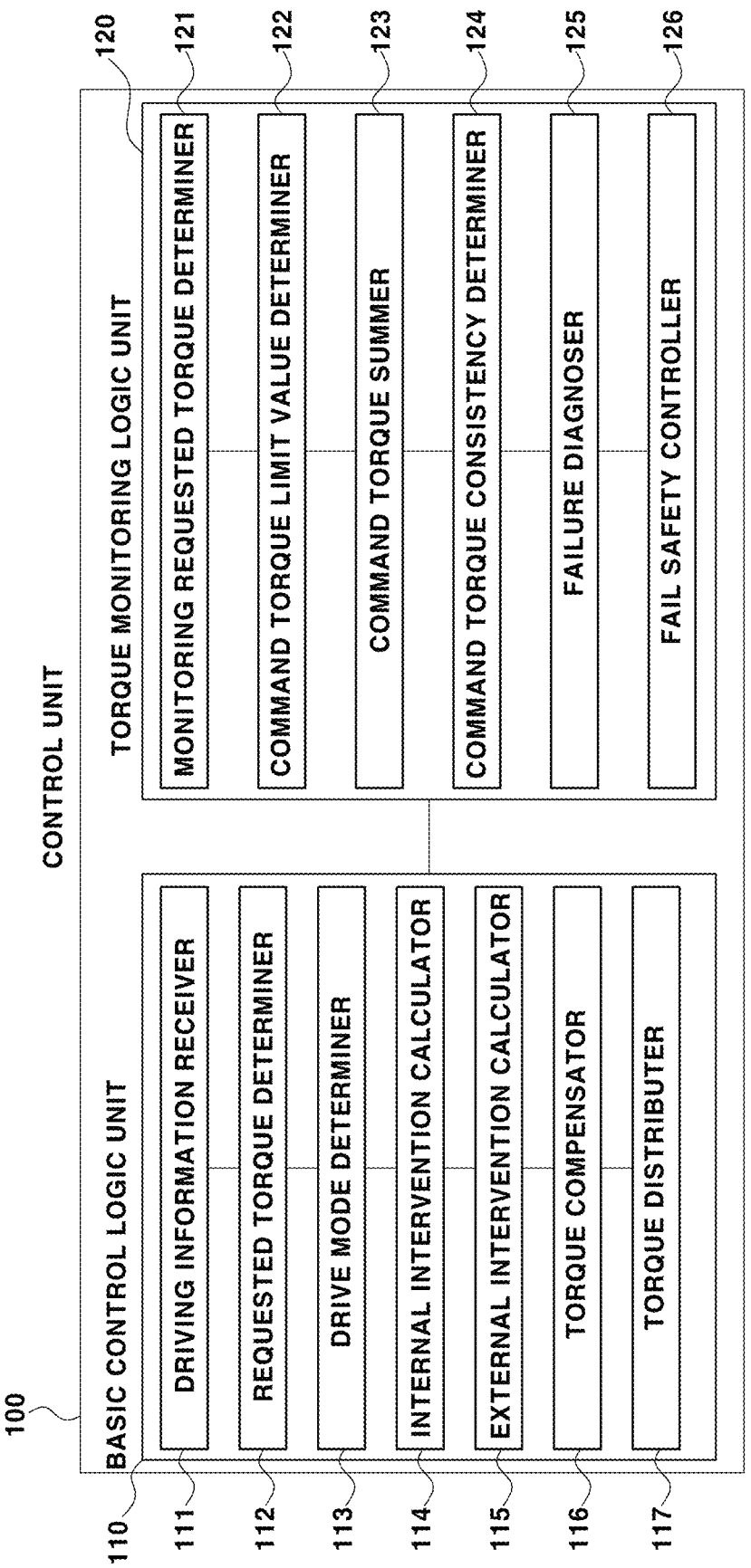

FIG.2

CONTROL UNIT

BASIC CONTROL LOGIC UNIT — 110

DRIVING INFORMATION RECEIVER — 111

REQUESTED TORQUE DETERMINER — 112

DRIVE MODE DETERMINER — 113

INTERNAL INTERVENTION CALCULATOR — 114

EXTERNAL INTERVENTION CALCULATOR — 115

TORQUE COMPENSATOR — 116

TORQUE DISTRIBUTER — 117

100

TORQUE MONITORING LOGIC UNIT — 120

MONITORING REQUESTED TORQUE DETERMINER — 121

COMMAND TORQUE LIMIT VALUE DETERMINER — 122

COMMAND TORQUE SUMMER — 123

COMMAND TORQUE CONSISTENCY DETERMINER — 124

FAILURE DIAGNOSER — 125

FAIL SAFETY CONTROLLER — 126

TORQUE MONITORING SYSTEM AND METHOD OF A HYBRID ELECTRIC VEHICLE

CROSS-REFERENCE TO RELATED APPLICATION

This application claims under 35 U.S.C. § 119(a) the benefit of and priority to Korean Patent Application No. 10-2024-0003938 filed on Jan. 10, 2024, the entire contents of which are incorporated herein by reference.

BACKGROUND

(a) Technical Field

The present disclosure relates to a torque monitoring system and method of a hybrid electric vehicle that may accurately diagnose whether or not there is an abnormality in torque determination and command generation.

(b) Background Art

A hybrid electric vehicle is a vehicle that travels using an engine (i.e., an internal combustion engine) and a motor as a power source. As one of the powertrain types of hybrid electric vehicles, a transmission-mounted electric device (TMED)-type hybrid system is known.

In the TMED-type hybrid system, an engine clutch is placed between an engine and a motor, which are devices for driving a vehicle, and a transmission is connected to the output side of the motor. Further, an inverter to drive and control the motor is mounted in the vehicle. The motor is connected to a high-voltage main battery in the vehicle through the inverter so as to be chargeable and dischargeable.

The inverter converts direct current DC supplied from the battery into alternating current AC and applies the alternating current AC to the motor through a power cable when driving the motor. Additionally, the inverter converts alternating current AC generated by the motor into direct current DC and supplies the direct current DC to the battery when regenerating the motor.

In addition, a motor which is a starter generator, is connected to the engine so that power may be transmitted at all times. The motor starts the engine or generates power using rotational force transmitted from the engine, i.e., a hybrid starter generator (HSG), that is provided in the vehicle. The HSG is also a type of motor, and may be operated as both a motor and a generator like the motor for driving the vehicle (i.e., the drive motor). The HSG is connected to the battery through an inverter so as to be chargeable and dischargeable.

In a hybrid electric vehicle, a regenerative mode in which vehicle kinetic energy is recovered as electrical energy through power generation of the motor to charge a battery during coasting due to inertia or braking is performed. In the hybrid electric vehicle, the function of the regenerative mode is essential to increase vehicle efficiency and improve fuel efficiency.

Further, the hybrid electric vehicle requires appropriate power distribution between the engine and the motor to minimize fuel consumption and improve the fuel efficiency of the vehicle. A process of determining a target operating point and generating an engine torque command and a motor torque command in a TMED hybrid electric vehicle is as follows.

FIG. 1 is a block diagram showing the configuration of a control device which performs power control and shift control of a hybrid electric vehicle. As shown in FIG. 1, in the hybrid electric vehicle, a plurality of control units 10-40 perform cooperative control so as to achieve power control and shift control of the vehicle.

First, a hybrid control unit (HCU) 10, referred to as a high-level control unit, determines a driver's requested torque depending on a driver's driving intention based on vehicle driving information, such as a driver's accelerator pedal input value (APS value), brake pedal input value (BPS value), and vehicle speed.

Among driver's driving input values, the accelerator pedal input value may be detected by an accelerator position sensor (APS) and the brake pedal input value may be detected by a brake pedal position sensor (BPS).

Further, the hybrid control unit (HCU) 10 determines an engine on or off mode to satisfy the driver's requested torque (i.e., determines a drive mode), and performs torque distribution to drive devices based on the determined driver's requested torque and engine on/off mode information.

The hybrid control unit 10 determines an engine torque and a motor torque to satisfy the driver's requested torque depending on a distribution ratio and a distribution torque profile for power transmission. Then, the hybrid control unit 10 generates and outputs torque commands for respective power sources.

Accordingly, an engine control unit (ECU) 20 and a motor control unit (MCU) 30 receive the engine torque command and the motor torque command from the hybrid control unit 10, respectively, and control operation of the engine and the motor depending on the respective received torque commands.

Shift control is performed along with the above-described power control of the vehicle, and a transmission control unit (TCU) 40 determines a target gear position based on information collected from the vehicle, and controls operation of a transmission so as to perform shift to the target gear position.

The transmission control unit 40 provides current shift state information, such as the target gear position, a shift class, and a shift phase, to the hybrid control unit 10. The hybrid control unit 10 performs torque intervention control and the like with reference to the shift state information.

Such a hybrid control unit (HCU), which is an upper-level control unit, or a vehicle domain control unit (VDCU) in a conventional TMED vehicle has a structure that may not detect a situation where a torque is excessive compared to a driver's request. This deficiency may occur due to an error of software or hardware in basic control logic responsible for determining the torque of respective power sources (an engine, a motor, and an HSG) and for generating commands for the respective power sources.

Therefore, torque monitoring logic that may monitor torque determination and command generation of the basic control logic has been developed and known. Additionally, efforts to apply the torque monitoring logic to vehicles to secure acceleration and deceleration safety at a vehicle level are being made.

In applying the torque monitoring logic, as described above, due to the limitations of a microcontroller, the basic control logic was abbreviated, and monitoring of torque determination and command generation was performed on the abbreviated basic control logic.

However, according to the known torque monitoring logic, errors may occur in the process of diagnosing an abnormality, such as torque determination errors, command generation errors, and hardware failures in the basic control logic by receiving torque command values from the basic control logic. As a result, there is a problem that may result in misdiagnosis of an abnormality.

For example, external intervention torques about shift, active shift control (ASC), and a traction control system (TCS) received from other control units should be reflected in torque distribution logic that determines final torque command values for the respective power sources, i.e., the engine, the motor, and the HSG. However, when an error occurs in the process of reflecting the external intervention torques, the vehicle may be misdiagnosed as being in the normal state even though an error in the basic control logic has occurred.

Generally, a control unit of a vehicle determines a driver's intended torque based on a driver's accelerator pedal input value and a driver's brake pedal input value, and this torque is called a driver's requested torque.

However, in addition to the driver's intended torque, separate torques exist as the torques of the vehicle. For example, in order to secure driving performance and safety of the vehicle, there are separate torques required through the transmission control unit (TCU), the traction control system (TCS), a chassis control unit, and the like, and these torques are called intervention torques.

Further, due to the nature of hybrid electric vehicles, when the engine momentarily does not produce output torque relative to a command torque, additional torque should be added to or subtracted from the output torque of the engine by the motor. Additionally, engine friction torque should also be considered.

In controlling torques for driving the vehicle, it is desired to detect the occurrence of the above-described separate torques in addition to the driver's requested torque and to confirm whether or not these torques are normal in order to prevent excessive torque from being generated in the vehicle.

The above information disclosed in this Background section is only to enhance understanding of the background of the present disclosure. Therefore, the background section may contain information that does not form the prior art that is already known in this country to a person of ordinary skill in the art.

SUMMARY

The present disclosure has been made in an effort to solve the above-described problems associated with the prior art. It is an object of the present disclosure to provide a torque monitoring system and method of a hybrid electric vehicle that may accurately diagnose whether or not there is an abnormality in torque determination and command generation in basic control logic. Additionally, it is another object of the present disclosure to provide a torque monitoring system and method of a hybrid electric vehicle that may accurately monitor and diagnose a compensation torque, such as an intervention torque generated from the vehicle's perspective and an engine friction torque, in addition to the driver's request torque.

The objects of the present disclosure are not limited to the above-mentioned objects, and other objects not mentioned herein should be clearly understood by a person having ordinary skill in the art to which the present disclosure pertains (referred to as "a person skilled in the art") from the following description.

In one aspect, the present disclosure provides a torque monitoring method of a hybrid electric vehicle. The method includes: determining, by a control unit, final command torques for respective power sources by adding intervention torques for the respective power sources and additional torques for the respective power sources for torque compensation to command torques for the respective power sources distributed from a driver's requested torque. The method also includes: determining, by the control unit, a requested torque for monitoring based on vehicle driving information; and determining, by the control unit, compensation torques for the respective power sources depending on whether or not an engine clutch is engaged based on the intervention torques for the respective power sources and the additional torques for the respective power sources. The method also includes determining, by the control unit, a command torque limit value that is a sum of the determined requested torque for monitoring and the determined compensation torques for the respective power sources. Additionally, the method includes determining, by the control unit, whether there is an abnormality in a torque determination process at each operation based on the determined command torque limit value and a sum of the determined final command torques for the respective power sources.

In another embodiment, each of the intervention torques for the respective power sources may include: an internal intervention torque determined internally by the control unit to control vehicle motion; and an external intervention torque received from outside.

In another embodiment, the intervention torques for the respective power sources may include an engine intervention torque and a motor intervention torque.

In still another embodiment, the compensation torques for the respective power sources may include an engine compensation torque and a motor compensation torque. The additional torques for the respective power sources may include an additional engine torque and an additional motor torque. In a disengaged state of the engine clutch, the motor compensation torque may be determined as a sum of the motor intervention torque and the additional motor torque, and the engine compensation torque may be determined as zero.

In yet another embodiment, the compensation torques for the respective power sources may include an engine compensation torque and a motor compensation torque. The additional torques for the respective power sources may include an additional engine torque and an additional motor torque. Additionally, in an engaged state of the engine clutch, the motor compensation torque may be determined as a sum of the motor intervention torque and the additional motor torque, and the engine compensation torque may be determined as a sum of the engine intervention torque and the additional engine torque.

In still yet another embodiment, the additional torques for the respective power sources may include an additional engine torque and an additional motor torque. The additional engine torque may be determined as an engine friction torque, and the additional motor torque may be determined as a motor torque to compensate for a decrease or increase in engine output.

In a further embodiment, the compensation torques for the respective power sources may include an engine compensation torque and a motor compensation torque. The command torque limit value may be determined as a sum of the requested torque for monitoring, the engine compensation torque, and the motor compensation torque.

In another further embodiment, in determining whether there is the abnormality in the torque determination process at each operation, the control unit may be configured to diagnose that there is the abnormality in the torque determination process at each operation, when an absolute value of a difference between the command torque limit value and the sum of the determined final command torques for the respective power sources is greater than or equal to a predetermined set value. Additionally, the controller may be configured to diagnose that the torque determination process at each operation is normal, when the absolute value of the difference between the command torque limit value and the sum of the determined final command torques for the respective power sources is less than the predetermined set value.

In another aspect, the present disclosure provides a torque monitoring system of a hybrid electric vehicle. The torque monitoring system includes a control unit configured to, when a driver's requested torque is determined and a drive mode of the vehicle is determined: determine command torques for respective power sources based on the driver's requested torque by distributing the driver's requested torque depending on the drive mode; and determine final command torques for the respective power sources by adding intervention torques for the respective power sources and additional torques for the respective power sources for torque compensation to the determined command torques for the respective power sources. The control unit is further configured to: determine a requested torque for monitoring based on vehicle driving information; determine compensation torques for the respective power sources depending on whether or not an engine clutch is engaged based on the intervention torques for the respective power sources and the additional torques for the respective power sources; determine a command torque limit value that is a sum of the determined requested torque for monitoring and the determined compensation torques for the respective power sources; and determine whether there is an abnormality in each torque determination process based on the determined command torque limit value and a sum of the determined final command torques for the respective power sources.

In an embodiment, each of the intervention torques for the respective power sources may include: an internal intervention torque determined internally by the control unit to control vehicle motion; and an external intervention torque received from outside.

In another embodiment, the intervention torques for the respective power sources may include an engine intervention torque and a motor intervention torque.

In still another embodiment, the compensation torques for the respective power sources may include an engine compensation torque and a motor compensation torque. The additional torques for the respective power sources may include an additional engine torque and an additional motor torque. In a disengaged state of the engine clutch, the motor compensation torque may be determined as a sum of the motor intervention torque and the additional motor torque, and the engine compensation torque may be determined as zero.

In yet another embodiment, the compensation torques for the respective power sources may include an engine compensation torque and a motor compensation torque. The additional torques for the respective power sources may include an additional engine torque and an additional motor torque. In an engaged state of the engine clutch, the motor compensation torque may be determined as a sum of the motor intervention torque and the additional motor torque, and the engine compensation torque may be determined as a sum of the engine intervention torque and the additional engine torque.

In still yet another embodiment, the control unit may include a basic control logic unit configured to: determine the driver's requested torque; determine the drive mode of the vehicle; determine the command torques for the respective power sources based on the driver's requested torque; and determine the final command torques for the respective power sources. The control unit may also include a torque monitoring logic unit configured to: determine the requested torque for monitoring; determine the compensation torques for the respective power sources depending on whether or not the engine clutch is engaged; determine the command torque limit value; and determine whether there is the abnormality in each torque determination process.

In a further embodiment, the torque monitoring logic unit may be configured to receive information including: the command torques for the respective power sources based on the driver's requested torque; command torques for the respective power sources after reflecting the intervention torques for the respective power sources, which are obtained by adding the intervention torques for the respective power sources to the command torques for the respective power sources based on the driver's requested torque; the additional torques for the respective power sources for torque compensation; the final torque commands for the respective power sources; and the drive mode of the hybrid electric vehicle, from the basic control logic unit. The torque monitoring logic unit may be configured to use the received information to determine the compensation torques for the respective power sources and the command torque limit value.

In another further embodiment, the intervention torques for the respective power sources may include an engine intervention torque and a motor intervention torque. The torque monitoring logic unit may be configured to determine the engine intervention torque as a value obtained by subtracting an engine command torque based on the driver's requested torque from an engine command torque after reflecting the intervention torques received from the basic control logic unit. Additionally, the torque monitoring logic unit may be configured to determine the motor intervention torque as a value obtained by subtracting a motor command torque based on the driver's requested torque from a motor command torque after reflecting the intervention torques received from the basic control logic unit.

In still another further embodiment, the additional torques for the respective power sources may include an additional engine torque and an additional motor torque.

In yet another further embodiment, the additional engine torque may be determined as an engine friction torque. The additional motor torque may be determined as a motor torque to compensate for a decrease or increase in engine output.

In still yet another further embodiment, the compensation torques for the respective power sources may include an engine compensation torque and a motor compensation torque. The command torque limit value may be determined as a sum of the requested torque for monitoring, the engine compensation torque, and the motor compensation torque.

In a still further embodiment, the control unit may be configured to diagnose that there is the abnormality in each torque determination process, when an absolute value of a difference between the command torque limit value and the sum of the determined final command torques for the respective power sources is greater than or equal to a predetermined set value. The control unit may also be configured to diagnose that each torque determination process is normal, when the absolute value of the difference between the command torque limit value and the sum of the determined final command torques for the respective power sources is less than the predetermined set value.

Other aspects and embodiments of the present disclosure are discussed below.

The above and other features of the disclosure are discussed below.

BRIEF DESCRIPTION OF THE DRAWINGS

The above and other features of the present disclosure are described in detail with reference to certain embodiments thereof illustrated in the accompanying drawings which are given hereinbelow by way of illustration only, and thus are not limitative of the present disclosure, and wherein:

FIG. 2 is a block diagram illustrating a configuration of a control unit that performs a torque monitoring process according to the present disclosure.

Figure 1:
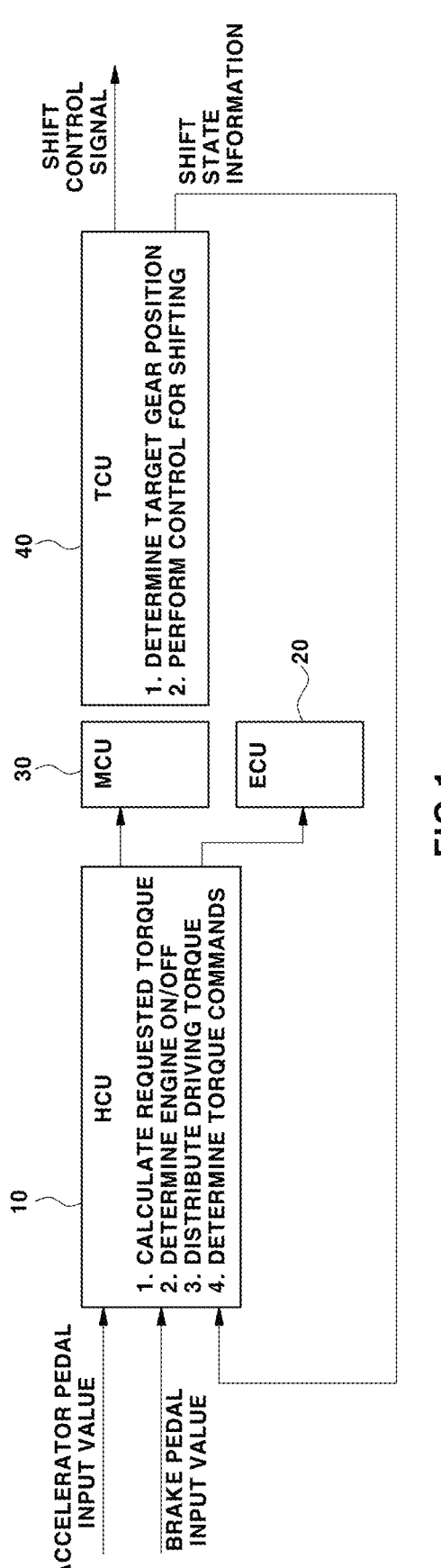
FIG. 1 is a block diagram illustrating a configuration of a control device which performs power control and shift control of a hybrid electric vehicle.

It should be understood that the appended drawings are not necessarily drawn to scale, presenting a somewhat simplified representation of various preferred features illustrative of the basic principles of the present disclosure. The specific design features of the present disclosure as disclosed herein, including, for example, specific dimensions, orientations, locations, and shapes, will be determined in part by the particular intended application and use environment.

In the figures, reference numbers refer to the same or equivalent parts of the present disclosure throughout the several figures of the drawing.

DETAILED DESCRIPTION

Hereinafter reference should be made in detail to various embodiments of the present disclosure, examples of which are illustrated in the accompanying drawings and described below. Specific structural or functional descriptions in embodiments of the present disclosure set forth in the description which follows are given to describe the embodiments of the present disclosure, and the present disclosure may be embodied in many alternative forms. Further, it should be understood that the present disclosure should not be construed as being limited to the embodiments set forth herein, and the embodiments of the present disclosure are provided only to completely disclose the disclosure and cover modifications, equivalents, or alternatives which come within the scope and technical range of the disclosure.

In the following description of the embodiments, terms, such as "first" and "second," are used only to describe various elements, and these elements should not be construed as being limited by these terms. These terms are used only to distinguish one element from other elements. For example, a first element described hereinafter may be termed a second element, and similarly, a second element described hereinafter may be termed a first element, without departing from the scope of the present disclosure.

When an element or layer is referred to as being "connected to" or "coupled to" another element or layer, it may be directly connected or coupled to the other element or layer, or intervening elements or layers may be present. In contrast, when an element or layer is referred to as being "directly connected to" or "directly coupled to" another element or layer, there may be no intervening elements or layers present. Other words used to describe relationships between elements should be interpreted in a like fashion, e.g., "between" versus "directly between," "adjacent" versus "directly adjacent," and the like.

Wherever possible, the same reference numbers will be used throughout the drawings to refer to the same or like parts. The terminology used herein is for the purpose of describing particular embodiments only and is not intended to be limiting. As used herein, singular forms may be intended to include plural forms as well, unless the context clearly indicates otherwise. The terms "comprises," "comprising," "including," and "having" are inclusive and therefore specify the presence of stated features, integers, operations, operations, elements, components, and/or combinations thereof, but do not preclude the presence or addition of one or more other features, integers, operations, operations, elements, components, and/or combinations thereof.

When a controller, component, device, element, part, unit, module, or the like of the present disclosure is described as having a purpose or performing an operation, function, or the like, the controller, component, device, element, part, unit, or module should be considered herein as being "configured to" meet that purpose or perform that operation or function. Each controller, component, device, element, part, unit, module, and the like may separately embody or be included with a processor and a memory, such as a non-transitory computer-readable media, as part of the apparatus.

The present disclosure provides a torque monitoring system and method of a hybrid electric vehicle that may accurately diagnose whether there is an abnormality in torque determination and command generation. Specifically, the present disclosure provides a system and method that may perform accurate torque monitoring and detect an excessive torque. Particularly, the present disclosure provides a system and method that may prevent misdiagnosis due to errors in a process of reflecting a compensation torque.

Figure 3:
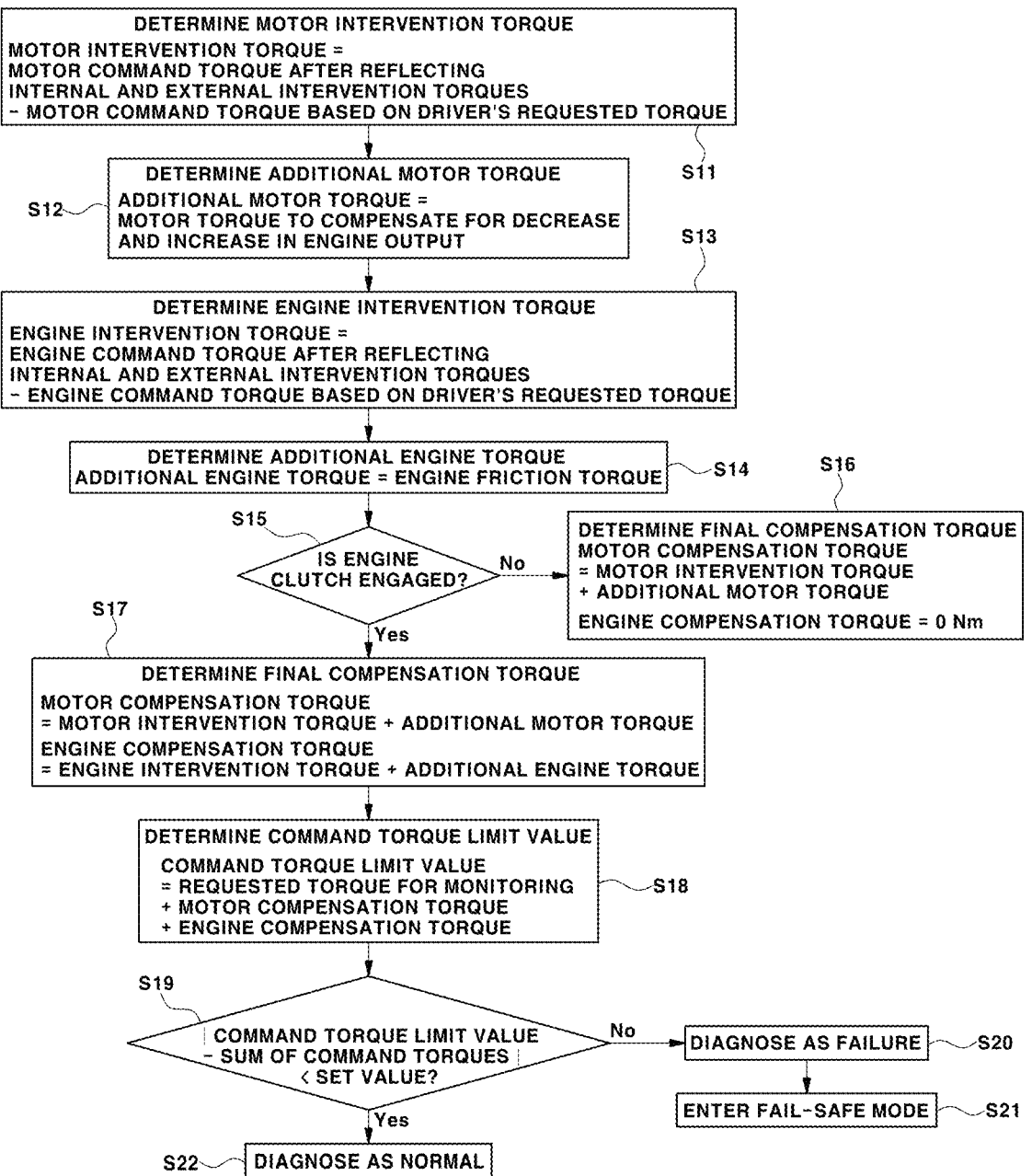
FIG. 3 is a flowchart describing a torque monitoring process according to the present disclosure.

FIG. 2 is a block diagram illustrating the configuration of a control unit that performs a torque monitoring process according to the present disclosure, and also shows a component that performs basic control logic. Further, FIG. 3 is a flowchart describing the torque monitoring process according to the present disclosure. FIG. 3 represents a method for both a torque command generation process for respective power sources in the basic control logic and the torque monitoring process in torque monitoring logic, which are performed by a control unit 100.

As shown in FIG. 2, the control unit 100 which performs the torque monitoring process according to the present disclosure includes a first processor (a "basic control logic unit" in FIG. 2) 110 configured to perform the basic control logic for torque determination and command generation for the respective power sources. Additionally, the control unit 100 includes a second processor (a "torque monitoring logic unit" in FIG. 2) 120 configured to perform the torque monitoring logic for torque monitoring and error detection.

By the configuration of FIG. 2, in the basic control logic, when an error occurs in torque distribution logic configured to, after the driver's requested torque is distributed as torques for the respective power sources (command torques), determine torques for the respective power sources after reflecting compensation torques, obtained by adding the compensation torques, such as intervention torques for the respective power sources and additional torques for the respective power sources, to the distributed torques for the respective power sources, and an excessive command torque occurs, this situation may be diagnosed in the torque monitoring logic.

In the present disclosure, the control unit 100 performs a basic control process of generating torque commands for the respective power sources and a torque monitoring process of monitoring torques and performing failure diagnosis. The control unit 100 may be a hybrid control unit (HCU) which is a high-level control unit, or a vehicle domain control unit (VDCU) into which a plurality of control units is integrated.

The control unit 100 is mounted on a hybrid electric vehicle and is responsible for controlling torques of a vehicle drive system depending on a driver's request. The control unit 100 is also responsible for monitoring whether or not torque values corresponding to commands output for the respective power sources are reliable.

As shown in the figures, the control unit 100 includes the first processor (hereinafter referred to as "basic control logic unit") 110 configured to perform the basic control logic. The basic control logic unit 110 includes a driving information receiver 111, a requested torque determiner 112, a drive mode determiner 113, an internal intervention calculator 114, an external intervention calculator 115, a torque compensator 116, and a torque distributer 117.

The driving information receiver 111 of the control unit 100 receives vehicle driving information detected by a driving information detector (not shown) from the driving information detector or another control unit. The driving information detector may include an accelerator position sensor (APS) which detects a driver's accelerator pedal input value (APS value), a brake pedal position sensor (BPS) which detects a driver's brake pedal input value (BPS value), and a vehicle speed sensor that detects a vehicle speed.

The vehicle driving information detected by the driving information detector is information indicating a vehicle driving state, and includes the driver's accelerator pedal input value (APS value), the driver's brake pedal input value (BPS value), and the vehicle speed.

The vehicle speed sensor may be a wheel speed sensor, and acquisition of the vehicle speed information from a signal from the wheel speed sensor is known technology and a detailed description thereof has been omitted.

The requested torque determiner 112 determines the driver's request torque from the vehicle driving information received through the driving information receiver 111. In other words, the requested torque determiner 112 determines the driver's requested torque depending on a driver's driving intention based on the vehicle driving information including driving input values (pedal input values), such as the driver's accelerator pedal input value (APS value) and the driver's brake pedal input value (BPS value), and the vehicle speed.

The drive mode determiner 113 determines a drive mode (a powertrain (PT) mode), such as a hybrid electric vehicle (HEV) mode, an electric vehicle (EV) mode, or the like, based on the determined driver's requested torque and charging and discharging related information, such as a charging and discharging strategy depending on a battery state.

Further, before torque distribution is performed by the torque distributer 117, a process of determining intervention torques by the internal intervention calculator 114 and the external intervention calculator 115, and a process of determining compensation torques by the torque compensator 116 are performed.

Before the control unit 100 determines final command torques for the respective power sources, there are interventions that are internally processed to control vehicle motion. For example, the e-ride function that minimizes vehicle shaking and provides a comfortable ride by adjusting the torque of a motor in a situation in which the vehicle passes over a bump (i.e., a speed bump), or accelerates, the e-handling function that increases steering response and turning stability by moving the center of gravity through acceleration and deceleration control when entering and exiting a curved road, and the electric dynamic torque vectoring control (e-DTVC) function that implements torque vectoring, are known. Internal torque interventions are performed to provide these functions.

Torque intervention may be performed by determining intervention torques and reflecting the determined intervention torques to the command torques for the respective power sources distributed from the driver's requested torque by the control unit 100. The internal intervention calculator 114 of the control unit 100 determines internal intervention torques for vehicle motion control, as described above, separately from the driver's requested torque.

In addition, the control unit 100 receives intervention torques from other external control units, such as a transmission control unit (TCU), a traction control system (TCS), a chassis control unit, and the like. The external intervention calculator 115 processes the intervention torques received from the other control units, and determines final external intervention torques by reflecting the intervention torques in the command torques for the respective power sources distributed from the driver's requested torque (the command torques for the respective power sources based on the driver's requested torque).

In the present disclosure, the internal intervention torque and the external intervention torque may be obtained for each power source mounted in the vehicle. Further, an additional torque, which is described below in the present disclosure, may also be obtained for each power source. The power sources may include an engine and a motor, which are devices configured to drive the vehicle, and a hybrid starter generator (HSG) directly connected to the engine so as to transmit power thereto.

Further, in the present disclosure, the torque compensator 116 of the control unit 100 compares an engine torque value calculated thereby with an actual engine torque value, and calculates a torque that needs to be compensated by the motor when the calculated engine torque value is less than the actual engine torque value or exceeds the actual engine torque value. Additionally, the torque compensator 116 calculates an engine friction torque which is an additional torque for engine torque compensation, separately from the torque that needs to be compensated by the motor.

In other words, the torque compensator 116 of the control unit 100 determines the additional torques for the respective power sources for torque compensation, such as a motor torque for compensation ("additional motor torque" in FIG. 3) and an engine friction torque ("additional engine torque" in FIG. 3). The engine friction torque generated by engine friction is also a torque that needs to be monitored because it is included in an engine output torque like an engine clutch value.

The motor torque for compensation ("additional motor torque" in FIG. 3) is a motor torque to compensate for a decrease or increase in engine output. For example, when the engine starts, the engine torque is not initially generated as much as a command (the engine torque command) from the high-level control unit (the HCU, or the like), and thus, a torque shortfall is handled by the motor. The torque shortfall handled by the motor becomes the motor torque for compensation. In other words, even though an engine torque of 100 Nm is requested at the beginning of engine startup, when an engine torque of only 60 Nm is actually generated from the engine, the motor should additionally compensate for a torque of 40 Nm.

In the present disclosure, the intervention torques for the respective power sources include an internal intervention torque for the engine, an external intervention torque for the engine, an internal intervention torque for the motor, and an external intervention torque for the motor. Further, the additional torques for the respective power sources for compensation include the above-described engine friction torque, and the motor torque to compensate for the decrease or increase in the engine output.

Further, in the present disclosure, the sum of the intervention torque for each power source and the additional torque for each power source is defined as a compensation torque for each power source. In addition, the sum of the internal intervention torque for the engine, the external intervention torque for the engine, and an additional engine torque, such as the engine friction torque, is defined as an engine compensation torque. Furthermore, a motor compensation torque is defined as the sum of the internal intervention torque for the motor, the external intervention torque for the motor, and an additional motor torque, such as the motor torque to compensate for the decrease or increase in the engine output.

In the present disclosure, monitoring and diagnosis are performed on not only the driver's requested torque but also the intervention torques for the respective power sources, the additional torques for the respective power sources for compensation, and the compensation torque for the respective power sources, which are determined in the basic control logic unit. Additionally, the calculation processes and methods, the application purposes, the roles, the effects, and the like of the compensation torques, such as the above-described internal intervention torques, external intervention torques, engine friction torque, and motor torque to compensate for the decrease or increase in the engine output are well-known. As a result, a detailed description thereof has been omitted in this specification.

The torque distributor 117 of the control unit 100 performs the torque distribution logic based on the drive mode determined by the drive mode determiner 113. Depending on the torque distribution logic, the command torques for the respective power sources, i.e., an engine torque, a motor torque, and a HSG torque, are determined by distributing the driver's requested torque to the respective power sources depending on the drive mode. The engine torque, the motor torque, and the HSG torque are the command torques for the respective power sources before reflecting the internal and external intervention torques and the additional torques for compensation (i.e., the command torques for the respective power sources before reflecting the compensation torques).

Further, the torque distributer 117 of the control unit 100 determines the final command torques for the respective power sources (i.e., the command torques for the respective power sources after reflecting the compensation torques) by adding the compensation torques for the respective power sources to the determined command torques for the respective power sources. The compensation torques for the respective power sources are torques that are the sums of the internal intervention torques for the respective power sources, the external intervention torques for the respective power sources, and the additional torques for the respective power sources.

Depending on the drive mode (PT mode), the internal intervention torque for the engine, the external intervention torque for the engine, and the additional engine torque, such as the engine friction torque, are confirmed, only when an engine clutch is engaged to enable power transmission between the engine and the motor, and are added to the engine command torque.

When the engine clutch is disengaged so that power transmission is not enabled, the engine torque is not transmitted to the vehicle wheels. Thus, it is unnecessary to reflect and use the internal intervention torque for the engine, the external intervention torque for the engine, and the additional engine torque. At this time, the engine compensation torque, which is the sum of the internal intervention torque for the engine, the external intervention torque for the engine, and the additional engine torque, may be zero (0 Nm).

This is the same in the second processor (hereinafter referred to as "torque monitoring logic unit") 120, which is described below. In the engaged state of the engine clutch, a total compensation value to determine a command torque limit value by a command torque limit value determiner 122 of the torque monitoring logic unit 120 is the sum of: a motor intervention torque, which is the total intervention torque for the motor (the drive motor); an engine intervention torque, which is the total intervention torque for the engine; the motor torque to compensate for the decrease or increase in the engine output (i.e., the additional motor torque); and the engine friction torque (i.e., the additional engine torque).

In the disengaged state of the engine clutch, the total compensation value to determine the command torque limit value is the sum of only the motor intervention torque and the motor torque to compensate for the decrease or increase in the engine output (i.e., the additional motor torque or the motor compensation torque). At this time, the engine compensation torque, which is the sum of the engine intervention torque and the engine friction torque (i.e., the additional engine torque) becomes 0 Nm.

When the final command torques for the respective power sources, obtained by reflecting the compensation torques for the respective power sources in the command torques for the respective power sources based on the driver's requested torque, are determined, the torque distributer 117 of the control unit 100 generates and outputs torque commands for the respective power sources to control operation of the respective power sources. This is achieved so as to generate and apply torques corresponding to the determined final command torques for the respective power sources. Consequently, the operation of the respective power sources may be controlled depending on the final torque commands for the respective power sources, generated and output by the control unit 100.

The command torques for the respective power sources based on the driver's requested torque include "a motor command torque based on the driver's requested torque" and "an engine command torque based on the driver's requested torque" in FIG. 3.

Further, in the present disclosure, information, such as the command torques for the respective power sources determined by distributing the driver's requested torque (the command torques based on the driver's requested torque), the command torques for the respective power sources after reflecting the internal and external intervention torques, the engine friction torque, the motor torque to compensate for the decrease or increase in the engine output, and the final torque commands for the respective power sources, is transmitted to the torque monitoring logic unit 120 in real time.

Additionally, the drive mode of the vehicle, determined in the process of performing the basic control logic is transmitted to the torque monitoring logic unit 120 in real time.

The control unit 100 performs the torque monitoring logic simultaneously with the basic control logic. For this purpose, the control unit 100 further includes a component that performs the torque monitoring logic, i.e., the torque monitoring logic unit 120.

In the present disclosure, variables such as the pedal input values (the APS value and the BPS value) and the vehicle speed, memories, tasks, setting data (tables) in which tuning values of the variables (calibration variables) are set, and the like, are allocated and used independently of each other. Such variables are used in the calculation of torques for monitoring in the torque monitoring logic unit 120 and in the calculation of torques in the basic control logic 110.

In addition, the torque monitoring logic unit 120 may also monitor whether excessive torque detection and determination are not properly performed. In other words, when the torque monitoring unit 120 does not detect and determine excessive torque properly, monitoring of the basic control logic is difficult.

In the present disclosure, the torque monitoring logic unit 120 of the control unit 100 may include a monitoring requested torque determiner 121, the command torque limit value determiner 122, a command torque summer 123, a command torque consistency determiner 124, a failure diagnoser 125, and a fail safety controller 126.

The monitoring requested torque determiner 121 determines a driver's requested torque based on the vehicle driving information including the driving input values (pedal input values), such as the accelerator pedal input value (APS value) and the brake pedal input value (BPS value). Additionally, the monitoring requested torque determiner 121 determines a driver's requested torque based on the vehicle speed in the same manner as the requested torque determiner 112 of the basic control logic unit 110, but uses a requested torque determination process, which is an abbreviated version of the driver's requested torque determination process of the basic control logic, so as to determine a requested torque for monitoring. A driver's requested torque determined by the monitoring requested torque determiner 121 is defined as the requested torque for monitoring.

As an example, the requested torque determiner 112 of the basic control logic unit 110 determines a driver's requested torque corresponding to vehicle driving variables, such as the driver's pedal input values (APS value, BPS value), and the vehicle speed. Additionally, the requested torque determiner 112 of the basic control logic unit 110 determines a currently selected drive mode using setting data (a table for each drive mode) for each drive mode (the eco mode, the normal mode, the sport mode, and the like), but the monitoring requested torque determiner 121 of the torque monitoring logic unit 120 determines a driver's requested torque corresponding to the vehicle driving variables using one setting data regardless of the drive mode.

When the requested torque for monitoring is determined through the abbreviated process of the driver's requested torque determination process of the basic control logic, as described above, the command torque limit value determiner 122 determines a command torque limit value by adding a total compensation value (the sum of compensation values for the respective power sources) to the determined requested torque for monitoring. The compensation value is a value in consideration of torque intervention and torque compensation.

For this purpose, the command torque limit value determiner 122 receives the command torques for the respective power sources based on the driver's requested torque, determined by distributing the driver's requested torque, from the basic control logic unit 110 in real-time. In FIG. 3, "motor command torque based on driver's requested torque" and "engine command torque based on driver's requested torque" are the command torques for the respective power sources determined by distributing the driver's requested torque.

In addition, the command torque limit value determiner 122 receives information, such as the command torques for the respective power sources after reflecting the internal and external intervention torques, the engine friction torque, the motor torque to compensate for the decrease or increase in the engine output, the final command torques for the respective power sources, the drive mode of the vehicle, and the like, in real-time.

The command torques for the respective power sources after reflecting the internal and external intervention torques include the motor command torque after reflecting the internal and external intervention torques, and the engine command torque after reflecting the internal and external intervention torques.

Further, the motor command torque after reflecting the internal and external intervention torques is the sum of the motor command torque based on the driver's requested torque and the internal and external intervention torques for the motor. Additionally, the engine command torque after reflecting the internal and external intervention torques is the sum of the engine command torque based on the driver's requested torque and the internal and external intervention torques for the engine.

Further, the command torque limit value determiner 122 determines the motor intervention torque, the additional motor torque, the engine intervention torque, and the additional engine torque, as shown in FIG. 3. The motor intervention torque may be determined as a value obtained by subtracting the motor command torque based on the driver's requested torque from the motor command torque after reflecting the internal and external intervention torques (S11). Furthermore, the additional motor torque may be determined as the motor torque to compensate for the decrease or increase in the engine output (S12).

In addition, the engine intervention torque may be determined as a value obtained by subtracting the engine command torque based on the driver's requested torque from the engine command torque after reflecting the internal and external intervention torques (S13). Furthermore, the additional engine torque may be determined as the engine friction torque (S14).

In order to detect an abnormal torque such as an excessive torque, the intervention torques for the respective power sources are determined using difference values between the command torques for the respective power sources, in which both the intervention torque and the external torque are reflected, and the command torques for the respective power sources, in which both the intervention torque and the external torque are not reflected.

Thereafter, the command torque limit value determiner 122 confirms whether or not the engine clutch is engaged (S15). This is achieved to determine whether or not only the intervention torque for the motor and the additional motor torque for compensation will be used, or whether or not both the intervention torques for the motor and the engine and both the additional motor torque for compensation and the additional engine torque for compensation will be used to determine whether or not the engine clutch is engaged. When the engine clutch is not engaged, the engine torque may not affect the overall torque of the vehicle.

The command torque limit value determiner 122 determines a final compensation torque. The final compensation torque includes the motor compensation torque and the engine compensation torque. Additionally, when the engine clutch is disengaged, the motor compensation torque is determined as the sum of the motor intervention torque and the additional motor torque, and the engine compensation torque is determined as zero (0 Nm) (S16).

When the engine clutch is engaged, the motor compensation torque is determined as the sum of the motor intervention torque and the additional motor torque, and the engine compensation torque is determined as the sum of the engine intervention torque and the additional engine torque (S17).

Thereafter, the command torque limit value determiner 122 finally determines the command torque limit value by summing the requested torque for monitoring determined by the monitoring requested torque determiner 121, the motor compensation torque, and the engine compensation torque (S18).

Thereafter, the command torque summer 123 of the torque monitoring logic unit 120 sums the final command torques for the respective power sources (values in which both the internal and external intervention torques and the additional torque for compensation are reflected) received from the basic control logic unit 110. The command torque consistency determiner 124 determines the consistency of the command torques by comparing the command torque limit value determined by the command torque limit value determiner 122 and the sum of the final command torques for the respective power sources determined by the command torque summer 123 (S19).

When the absolute value of a difference between the command torque limit value determined by the command torque limit value determiner 122 and the sum of the final command torques for the respective power sources determined by the command torque summer 123 exceeds a set value predetermined as a margin value, the failure diagnoser 125 determines that there is an abnormality in the command torques and that there is a failure (i.e., an error in the torque distribution logic, and the like) (S20). The fail safety controller 126 allows the electric vehicle to enter a fail-safe mode and then performs fail-safe control (S21).

When the absolute value of the difference between the command torque limit value and the sum of the final command torques for the respective power sources is less than or equal to the set value predetermined as the margin value, the failure diagnoser 125 determines that the command torques are normal (S21).

As such, the torque monitoring system and method according to the present disclosure have been described in detail. According to the above-described torque monitoring system and method, it is possible to accurately diagnose whether or not there is an abnormality in torque determination and command generation in the basic control logic. Additionally, it is possible to accurately monitor and diagnose the compensation torque, such as the internal intervention torques and the external intervention torques for the respective power sources generated from the vehicle's perspective, the motor torque to compensate for the decrease or increase in the engine output, and the engine friction torque, in addition to the driver's requested torque.

In addition, the electric vehicle enters the fail-safe mode when the basic control logic is diagnosed as abnormal. As a result, stability and reliability of the basic control logic may be secured.

It should be apparent from the above description, a torque monitoring system and method of a hybrid electric vehicle according to the present disclosure may accurately diagnose whether or not there is an abnormality in torque determination and command generation in a basic control logic. It should also be apparent that a torque monitoring system and method of a hybrid electric vehicle may accurately monitor and diagnose compensation torque, such as internal intervention torques and external intervention torques for respective power sources generated from the vehicle's perspective, a motor torque to compensate for an decrease or increase in engine output, and an engine friction torque, in addition to a driver's requested torque.

In addition, the electric vehicle enters a fail-safe mode when the basic control logic is diagnosed as abnormal, and thereby, stability and reliability of the basic control logic may be secured.

The present disclosure has been described in detail with reference to the embodiments thereof. However, it should be appreciated by those having ordinary skilled in the art that changes may be made in these embodiments without departing from the principles and spirit of the present disclosure, the scope of which is defined in the appended claims and their equivalents.

What is claimed is:

1. A torque monitoring method of a hybrid electric vehicle, comprising:

determining, by a control unit, final command torques for respective power sources by adding intervention torques for the respective power sources and additional torques for the respective power sources for torque compensation to command torques for the respective power sources distributed from a driver's requested torque;

determining, by the control unit, a requested torque for monitoring based on vehicle driving information;

determining, by the control unit, compensation torques for the respective power sources depending on whether an engine clutch is engaged based on the intervention torques and the additional torques;

determining, by the control unit, a command torque limit value that is a sum of the determined requested torque and the determined compensation torques;

determining, by the control unit, whether there is an abnormality in a torque determination process at each operation based on the determined command torque limit value and a sum of the determined final command torques for the respective power sources; and controlling, by the control unit, torques of a vehicle drive system based on the driver's requested torque, wherein the control unit is mounted on the hybrid electric vehicle.

2. The torque monitoring method of claim 1, wherein each of the intervention torques for the respective power sources comprises:

an internal intervention torque determined internally by the control unit to control vehicle motion; and an external intervention torque received from outside.

3. The torque monitoring method of claim 2, wherein the intervention torques for the respective power sources comprise an engine intervention torque and a motor intervention torque.

4. The torque monitoring method of claim 3, wherein:

the compensation torques for the respective power sources comprise an engine compensation torque and a motor compensation torque;

the additional torques for the respective power sources comprise an additional engine torque and an additional motor torque; and in a disengaged state of the engine clutch, the motor compensation torque is determined as a sum of the motor intervention torque and the additional motor torque, and the engine compensation torque is determined as zero.

5. The torque monitoring method of claim 3, wherein:

the compensation torques for the respective power sources comprise an engine compensation torque and a motor compensation torque;

the additional torques for the respective power sources comprise an additional engine torque and an additional motor torque; and in an engaged state of the engine clutch, the motor compensation torque is determined as a sum of the motor intervention torque and the additional motor torque, and the engine compensation torque is determined as a sum of the engine intervention torque and the additional engine torque.

6. The torque monitoring method of claim 1, wherein:

the additional torques for the respective power sources comprise an additional engine torque and an additional motor torque;

the additional engine torque is determined as an engine friction torque; and the additional motor torque is determined as a motor torque to compensate for a decrease or increase in engine output.

7. The torque monitoring method of claim 1, wherein:

the compensation torques for the respective power sources comprise an engine compensation torque and a motor compensation torque; and the command torque limit value is determined as a sum of the requested torque for monitoring, the engine compensation torque, and the motor compensation torque.

8. The torque monitoring method of claim 1, wherein, in determining whether there is the abnormality in the torque determination process at each operation, the control unit is configured to:

diagnose that there is the abnormality in the torque determination process at each operation, when an absolute value of a difference between the command torque limit value and the sum of the determined final command torques is greater than or equal to a predetermined set value; and diagnose that the torque determination process at each operation is normal, when the absolute value of the difference between the command torque limit value and the sum of the determined final command torques is less than the predetermined set value.

9. A torque monitoring system of a hybrid electric vehicle, comprising a control unit, wherein when a driver's requested torque is determined and a drive mode of the hybrid electric vehicle is determined, the control unit is configured to:

determine command torques for respective power sources based on the driver's requested torque by distributing the driver's requested torque based on the drive mode;

determine final command torques for the respective power sources by adding intervention torques for the respective power sources and additional torques for the respective power sources for torque compensation to the determined command torques for the respective power sources, determine a requested torque for monitoring based on vehicle driving information;

determine compensation torques for the respective power sources depending on whether an engine clutch is engaged based on the intervention torques for the respective power sources and the additional torques for the respective power sources;

determine a command torque limit value that is a sum of the determined requested torque and the determined compensation torques; and determine whether there is an abnormality in each torque determination process based on the determined command torque limit value and a sum of the determined final command torques for the respective power sources; and wherein the control unit is mounted on the hybrid electric vehicle and is configured to control torques of a vehicle drive system based on the driver's requested torque.

10. The torque monitoring system of claim 9, wherein each of the intervention torques for the respective power sources comprises:

an internal intervention torque determined internally by the control unit to control vehicle motion; and an external intervention torque received from outside.

11. The torque monitoring system of claim 10, wherein the intervention torques for the respective power sources comprise an engine intervention torque and a motor intervention torque.

12. The torque monitoring system of claim 11, wherein:

the compensation torques for the respective power sources comprise an engine compensation torque and a motor compensation torque;

the additional torques for the respective power sources comprise an additional engine torque and an additional motor torque; and in a disengaged state of the engine clutch, the motor compensation torque is determined as a sum of the motor intervention torque and the additional motor torque, and the engine compensation torque is determined as zero.

13. The torque monitoring system of claim 11, wherein:

the compensation torques for the respective power sources comprise an engine compensation torque and a motor compensation torque;

the additional torques for the respective power sources comprise an additional engine torque and an additional motor torque; and in an engaged state of the engine clutch, the motor compensation torque is determined as a sum of the motor intervention torque and the additional motor torque, and the engine compensation torque is determined as a sum of the engine intervention torque and the additional engine torque.

14. The torque monitoring system of claim 9, wherein the control unit comprises:

a basic control logic unit configured to:

determine the driver's requested torque, determine the drive mode of the hybrid electric vehicle, determine the command torques for the respective power sources based on the driver's requested torque, and determine the final command torques for the respective power sources; and a torque monitoring logic unit configured to:

determine the requested torque for monitoring, determine the compensation torques for the respective power sources depending on whether the engine clutch is engaged, determine the command torque limit value, and determine whether there is the abnormality in each torque determination process.

15. The torque monitoring system of claim 14, wherein the torque monitoring logic unit is configured to:

receive information comprising the command torques for the respective power sources based on the driver's requested torque, the command torques for the respective power sources after reflecting the intervention torques for the respective power sources that are obtained by adding the intervention torques for the respective power sources to the command torques for the respective power sources based on the driver's requested torque, the additional torques for the respective power sources for torque compensation, final torque commands for the respective power sources, and the drive mode of the hybrid electric vehicle, from the basic control logic unit; and use the received information to determine the compensation torques for the respective power sources and the command torque limit value.

16. The torque monitoring system of claim 15, wherein:

the intervention torques for the respective power sources comprise an engine intervention torque and a motor intervention torque; and the torque monitoring logic unit is configured to:

determine the engine intervention torque as a value obtained by subtracting an engine command torque based on the driver's requested torque from an engine command torque after reflecting the intervention torques received from the basic control logic unit; and determine the motor intervention torque as a value obtained by subtracting a motor command torque based on the driver's requested torque from a motor command torque after reflecting the intervention torques received from the basic control logic unit.

17. The torque monitoring system of claim 9, wherein the additional torques for the respective power sources comprise an additional engine torque and an additional motor torque.

18. The torque monitoring system of claim 17, wherein:

the additional engine torque is determined as an engine friction torque; and the additional motor torque is determined as a motor torque to compensate for a decrease or increase in engine output.

19. The torque monitoring system of claim 9, wherein:

the compensation torques for the respective power sources comprise an engine compensation torque and a motor compensation torque; and the command torque limit value is determined as a sum of the requested torque for monitoring, the engine compensation torque, and the motor compensation torque.

20. The torque monitoring system of claim 9, wherein the control unit is configured to:

diagnose that there is the abnormality in each torque determination process, when an absolute value of a difference between the command torque limit value and the sum of the determined final command torques for the respective power sources is greater than or equal to a predetermined set value; and diagnose that each torque determination process is normal, when the absolute value of the difference between the command torque limit value and the sum of the determined final command torques for the respective power sources is less than the predetermined set value.

21. A torque monitoring system of a hybrid electric vehicle, comprising a control unit, wherein when a driver's requested torque is determined and a drive mode of the hybrid electric vehicle is determined, the control unit is configured to:

determine command torques for respective power sources based on the driver's requested torque by distributing the driver's requested torque based on the drive mode;

determine final command torques for the respective power sources by adding intervention torques for the respective power sources and additional torques for the respective power sources for torque compensation to the determined command torques for the respective power sources, determine a requested torque for monitoring based on vehicle driving information;

determine compensation torques for the respective power sources based on whether an engine clutch is engaged based on the intervention torques for the respective power sources and the additional torques for the respective power sources;

determine a command torque limit value that is a sum of the determined requested torque and the determined compensation torques;

determine whether there is an abnormality in each torque determination process based on the determined command torque limit value and a sum of the determined final command torques for the respective power sources;

diagnose that there is the abnormality in each torque determination process, when an absolute value of a difference between the command torque limit value and the sum of the determined final command torques for the respective power sources is greater than or equal to a predetermined set value; and allow the hybrid electric vehicle to enter a fail-safe mode and then perform fail-safe control.

* * * * *